United States Patent [19]

Corcoran

[11] 3,805,598
[45] Apr. 23, 1974

[54] INDENTING RHEOMETER
[75] Inventor: Edward Michael Corcoran, East Hanover, N.J.
[73] Assignee: Bell Telephone Laboratories, Incorporated, Murray Hill, N.J.
[22] Filed: Dec. 6, 1971
[21] Appl. No.: 204,871

[52] U.S. Cl. ............................................. 73/81
[51] Int. Cl. .......................................... G01n 3/42
[58] Field of Search ............ 73/81, 85, 78; 100/295

[56] References Cited
UNITED STATES PATENTS

| | | | |
|---|---|---|---|
| 507,431 | 10/1893 | Gray | 100/295 X |
| 2,804,769 | 9/1957 | Clark | 73/81 |
| 2,834,202 | 5/1958 | Cook | 73/81 |
| 3,318,156 | 5/1967 | Dietert | 73/81 X |
| 3,443,422 | 5/1969 | Herzberg | 73/81 |
| 3,572,097 | 3/1971 | Kleesattel | 73/81 X |

Primary Examiner—Richard C. Queisser
Assistant Examiner—Stephen A. Kreitman
Attorney, Agent, or Firm—H. L. Newman; W. H. Kamstra; R. B. Havill

[57] ABSTRACT

Apparatus is disclosed for dynamically determining the rheological properties of a sample. The apparatus includes a table for supporting the sample, a loaded indenter for deforming the sample, and a recording monitor. The apparatus continuously determines and records deformation versus time as the loaded penetrator indents the surface of the sample, as well as determining and recording recovery of the sample upon removal of the load from the penetrator. The monitoring means includes an electrical transducer connected to the penetrator. The transducer is arranged so that it is independent from the applied loading weight, thereby permitting a large load to be applied while permitting a small and sensitive transducer to be used.

5 Claims, 9 Drawing Figures

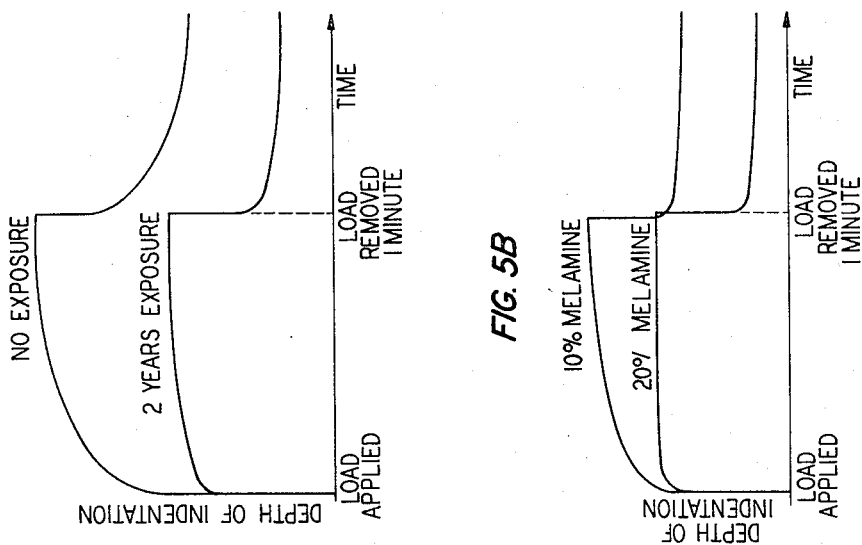
FIG. 5A
FIG. 5B
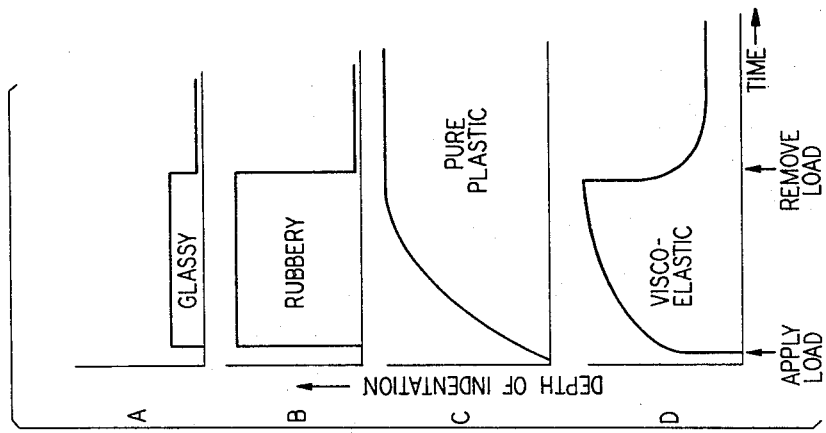
FIG. 4
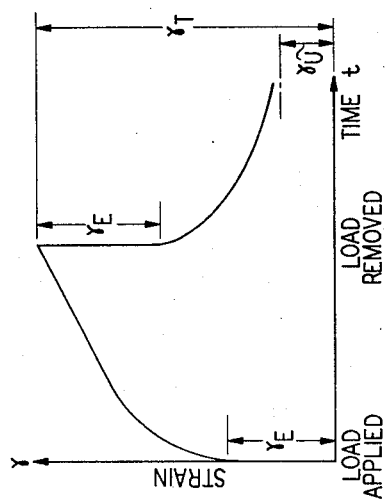
FIG. 3

3,805,598

INDENTING RHEOMETER

This invention relates to material testing apparatus and, more particularly, to apparatus for measuring the creep and creep compliance of materials.

BACKGROUND OF THE INVENTION

Three basic methods of determining the creep and creep compliance of viscoelastic materials have been used in the past. The first of these is a torsion test. A clear limitation of this type of test is the requirement that the sample submitted to torsion be homogeneous. Therefore, this type of test is inappropriate to test a finish applied to an underlying material.

A second test method is to submit a test sample to a tensile load and measure the elongation over a fixed time period. Again, this test is limited to a homogeneous sample.

The third type of test is a surface indentation test. A discussion of such a test is presented in the April, 1966, edition of "Materials Research and Standards," published by the American Society for Testing and Materials, in the article "Surface Penetration Test for Creep Compliance of Viscoelastic Materials" by William H. Hadley, beginning at page 185. The limitation of the test described is that a noncontinuous relationship between indentation and time is obtained. That is, a single point is obtained or, at best, several points, on the curve of depth of penetration versus time.

SUMMARY OF THE INVENTION

It is therefore an object of my invention to permit a continuous curve to be plotted depicting the relationship between depth of penetration and elapsed time for a viscoelastic material.

It is also an object of my invention to permit subjecting the test sample to high applied loads, thereby minimizing test effects and permitting more accurate determinations.

It is a further object of my invention to accurately measure small indentations, thereby enabling the use of small loads where surface finishes are delicate or where it is desired to measure skin-effects.

In an illustrative embodiment of my invention, apparatus is provided for directly registering and recording the rate of penetration of a test indenter into a sample under test. A load weight is applied to a weight pan which loads the indenter, causing the indenter to penetrate the sample being tested. The movement of the penetrator, and the depth of penetration, is detected by a linear voltage differential transformer. The transformer output connects to a recorder for directly recording the rate of penetration. The transducer core is positioned to be independent of any effects of the load weight. This permits a large load weight to be used, minimizing errors, while at the same time a small and sensitive transformer structure can be used since it is independent of the applied load.

DESCRIPTION OF THE DRAWINGS

FIG. 3 shows the general theoretical penetration versus time profile for a viscoelastic material;

FIGS. 4A through 4D show the profile of depth of penetration versus time for four general classes of materials; and FIGS. 5A and 5B show the relative change in viscoelastic properties of similar materials both with time and with varying composition.

DESCRIPTION OF THE ILLUSTRATIVE EMBODIMENT

Figure 1:
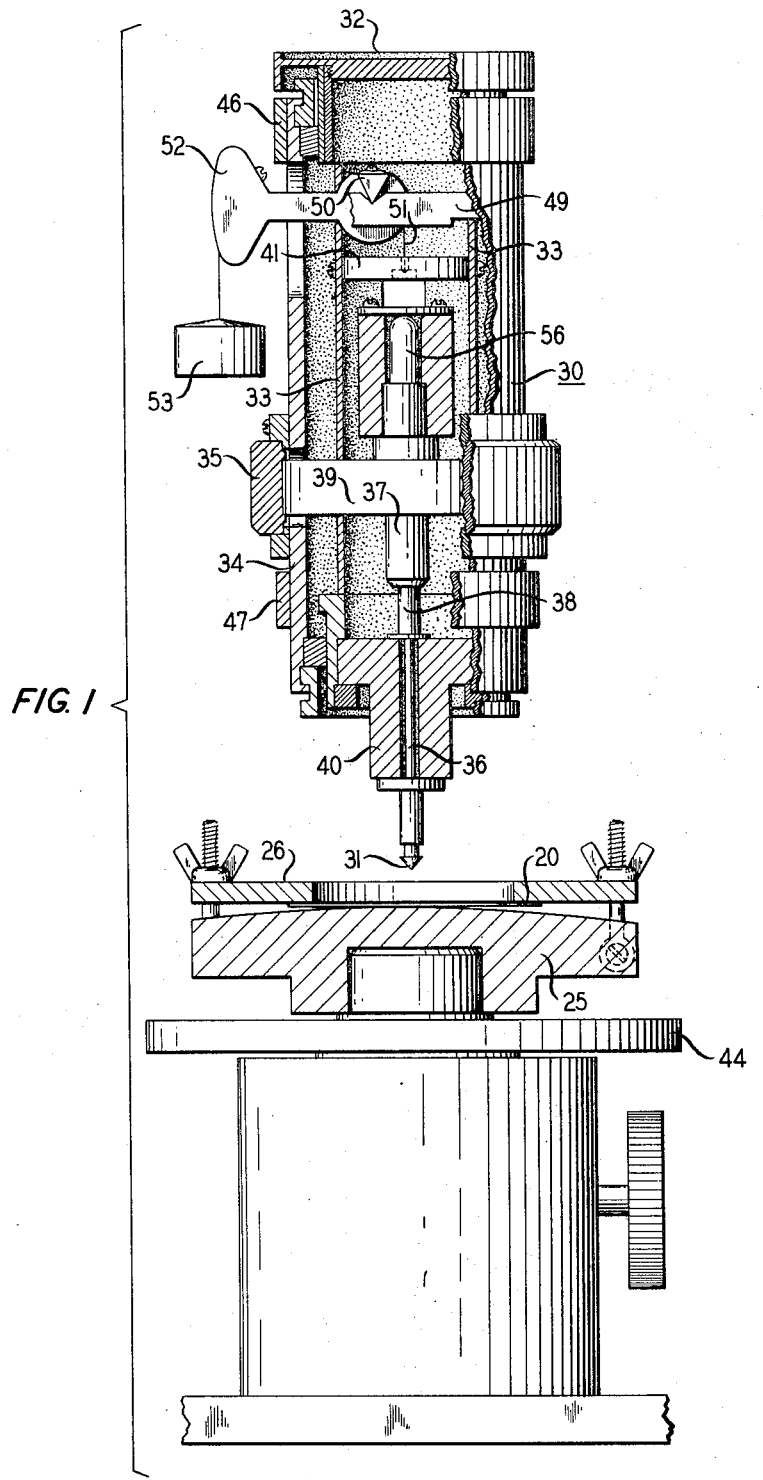
FIG. 1 is a partial sectional front elevation view of apparatus embodying my invention.
Figure 2:
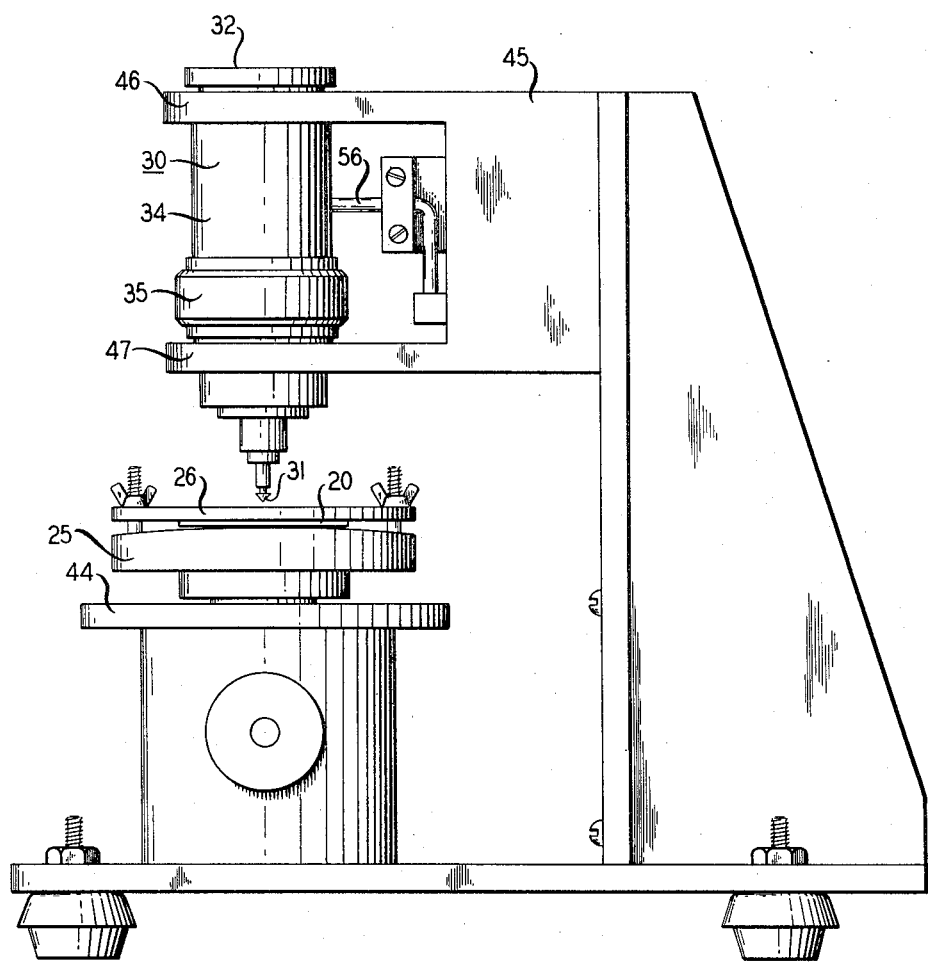
FIG. 2 is a side elevation of the apparatus shown in FIG. 1.

Apparatus for dynamically determining the rheological properties of a test sample is shown in FIGS. 1 and 2. A sample 20 is positioned on a support table 25. A loaded indenter 31 penetrates the surface of sample 20. The apparatus is arranged to give a continuous reading of the depth of penetration so that a profile of penetration versus time may be obtained for the tested sample.

Before discussing in detail the test apparatus, it would perhaps be helpful to discuss the significance of the information obtained. Namely, what does the penetration versus time profile disclose about the rheological properties of a sample? FIG. 3 depicts an idealized theoretical profile for a viscoelastic test sample (assuming the elastic limit of the sample has not been exceeded).

As the load is applied to the sample, an initial elastic strain $\gamma_E$ is produced in the sample by the penetration, essentially instantaneously. As the load continues to be applied, a viscous deformation takes place which is initially exponential but which becomes essentially a constant slope. When the load is removed, the penetrator rebounds initially by an amount $\gamma_E$ equal to the initial elastic strain (assuming the elastic limit has not been exceeded). Following this, the sample continues to recover, exponentially approaching an ultimate value. The ultimate value $\gamma_U$ represents the unrecoverable strain.

What are the important characteristics of such a profile? First, the total deformation of the material, $\gamma_T$, will be indicative of the relative elasticity of the sample. That is, the smaller the value of $\gamma_T$, the glassier the sample; the greater the value of $\gamma_T$, the more rubbery the sample. The value of unrecovered strain $\gamma_U$ will be indicative of the cold flow or creep of the material; the greater the value of $\gamma_U$, the more resultant cold flow.

The slope of the viscous deformation is indicative of the elastic/viscous nature of the material. Closely allied to this is the rapidity of the transition from the initial elastic strain to viscous deformation. Thus, the steeper the slope and the more gradual the transition, the more rubbery the sample. Conversely, a flatter slope and a sharp transition is indicative of a glassier material.

The profiles depicted in FIGS. 4A through 4D are representative of "pure" materials. For example, FIG. 4A shows the profile of a purely glassy material. That is, the initial elastic strain is low and almost totally recovered upon removal of the load. Further, there is essentially no viscous deformation.

By contrast, FIG. 4B shows a purely rubbery material. Here the initial elastic strain is quite high, yet is still almost totally recovered upon removal of the load. As with the glassy material, there is essentially no viscous deformation.

The profile of FIG. 4C is representative of a purely plastic material. Here, there is essentially no initial elastic strain. The material viscously (or plasticly) deforms until the load is removed. None of the strain is recovered upon removal of the load. FIG. 4D depicts the general profile for a viscoelastic material, as discussed with reference to FIG. 3. Naturally, FIGS. 4A through 4D all represent tests in which the elastic limit has not been exceeded.

Returning now to a discussion of the apparatus, attention is drawn to FIGS. 1 and 2. After a test sample 20 is placed on support table 25, a retainer 26 is positioned to hold the sample in place. Table 25, and sample 20, may be raised and lowered by turning adjustment wheel 44, which provides the adjustment for initially setting the apparatus. To initiate a test, table 25 is raised until indicator 31 is just touching sample 20. Once the initial positioning of indenter 31 has been completed, the determination of the rheological profile of the sample is ready to begin.

The weight of the entire head mechanism 30 is carried by a frame 45 which supports the head mechanism between an upper arm 46 and a lower arm 47. This insures that the only load to be applied to sample 20 will be the applied load weight and not any load from the test apparatus itself. An outer column 34 of head mechanism 30 supports an inner column 33, and its attached hardware, via a counterbalanced support 41. A rib 49 fastens to outer column 34. A knife-edge pivot 50 is positioned in a depression in rib 49. Pivot 50 connects to a leverage arm 52 which carries a counterbalance weight 53. Weight 53 is selected to equal the weight of indenter 31 and its attached apparatus, thus preventing this weight from acting on sample 20 or through the transducer. The end of arm 52 opposite weight 53 is connected to support 41 via a wire 51. In this way, the entire weight of inner column 33 is transmitted to outer column 34 via support 41, wire 51, pivot 50, and rib 49.

Once indenter 31 has been positioned to just touch the surface of sample 20, a linear voltage differential transformer (transducer) is used to detect movement of the indenter. The transducer comprises a winding 37 and a core 38. Winding 37 connects to a carrier 39 which connects to a threaded ring 35. Ring 35 has a very fine pitch (micrometer pitch) to permit precise movement of winding 37 so that the transducer may be "nulled" to begin the test.

Winding 37 comprises a primary coil and two secondary coils arranged to form a hollow cylinder. Core 38 is a magnetic iron core supported by a non-magnetic rod. When the primary coil is excited by a source of alternating current through cable 56, a voltage will be induced in each secondary coil. The secondary coils are symmetrical and connected in series opposition. As a result, if the core 38 is in the center, or null, position, the voltages in the secondary coils will cancel and there will be no net output voltage. However, if core 38 is displaced axially by movement of indenter 31, one secondary voltage will increase and one will decrease and a net output signal will be produced which is proportional to the displacement from the "null" position at the start of the test. This net output signla is conveyed via cable 56 to a recording device (not shown). A good example of such a transducer is the Daytronics DS100 Linear Displacement Transducer.

A load weight (not shown) is applied to a weight pan 32 to load indenter 31 prior to nulling the transducer. Weight pan 32 connects directly to inner column 33. The load is transmitted through inner column 33 to an indenter support 40. Support 40, in turn, applies the load to indenter 31.

As the test begins and the applied load forces indenter 31 to penetrate sample 20, core 38 moves relative to winding 37. This movement within the transducer creates the electrical signal transmitted via cable 56 to the recording unit. The electrical signal is analogous to the depth of penetration. Therefore, if the electrical signal is connected to the input of a strip chart recorder, a profile of penetration versus time is directly obtained for the sample.

To obtain a complete profile for evaluation, not only is the penetration due to the applied load determined, but also the recovery of the sample upon removal of the load. Therefore, a fixed time period after the load is applied, the load is removed. The indenter is then forced back out of the test sample as the material of the sample recovers. The depth of penetration now decreases with time, giving the complete rheological profile for loading and recovery.

The support table 25 is advantageously made to have a large spherical radius (on the order of 3 feet). This serves several purposes. First, it provides a point-to-point indentation while still providing good mechanical support for a test sample. Second, it insures that dirt, minor imperfections, or other flaws in the test sample will not generate false readings. That is, the sample will not "rock" when the indenter is applied due to dirt between the table and the sample. Neither will the response be "spongy" because the sample immediately under the indenter is initially positioned off the supporting table because of surface defects on the underside of the sample.

FIG. 5A shows actual results of tests run on two samples of a vinyl organosol finish both before and after two years of outdoor exposure. Analysis of the material profiles indicates that exposure has degraded the material and the loss of plasticizer has made the finished material more glassy, harder, less plastic, and less subject to cold flow or creep.

Comparison of two materials having similar composition is shown in FIG. 5B, which is also the result of actual tests. The two materials tested were white, soya alkyd-amine enamels containing 10 percent and 20 percent melamine formaldehyde. The sample lower in melamine formaldehyde is seen to be softer, more plastic, more rubbery, less glassy, and exhibits more cold flow or creep. Because it is less cross-linked, it suffered more unrecoverable deformation.

This test method and its related apparatus has a twofold significance. First, finishes can be tested while still applied to a substrate. This is particularly important where the finish cannot be stripped from its substrate for testing. The finish alone can also be tested with this method by using a small load to obtain slight indentations. Previously known tests have had such limited sensitivity that large indentations were required and the significance of the indentation of the finish was often masked by the lack of integrity at the finish-substrate bond. Thus the indentation resulting from the viscoelastic penetrations of the finish could not be distinguished from the indentations caused by voids at the bond, etc.

A second significant feature is that the applied load does not act through the transducer. The load is applied completely independent from the transducer mechanism. This permits a small, sensitive transducer to be used since no load is applied through the core. The head mechanism may be strengthened to insure that the loading produces essentially no lateral deflection. Finally, the independence of the load application from the transducer permits a relatively high load to be applied. This minimizes many test errors by making the results of the depth of penetration orders of magnitude greater than normal test error.

A typical applied load weight would be 1 kilogram. A test sample 6 inches × 3½ inches has been found to be quite satisfactory to handle. Any size or shape indenter could be used, although ¼ inch ball, Knoop or Vickers pyramid each possesses particular advantages. The auxiliary equipment might include a variable speed 10-inch strip chart and a Daytronics Model 300D Transducer Amplifier-Indicator. Using this equipment with the DS100 transducer, indentations of 0.000001 inches (<0.03 microns) have been readily and accurately detected and recorded.

What is claimed is:

1. Test apparatus for dynamically determining the rheological properties of a sample, the apparatus comprising
   means for supporting the sample;
   an identer;
   means for applying a load to the indenter so that the indenter moves into the sample; and
   a transducer connected to said applying means and responsive to movement of said identer for generating a continuous electrical signal corresponding to the varying depth of penetration of said indenter into said sample whereby a waveform of said signal presents a continuous profile representative of the plastic, elastic, and viscoelastic properties of said sample.

2. Apparatus in accordance with claim 1 wherein the means for supporting the sample comprises
   a platform having a convex surface with a large spherical radius so that the sample under test is supported effectively by the platform surface while presenting essentially a point-to-point contact area on the sample between the platform and the indenter.

3. Apparatus in accordance with claim 2 also comprising
   retaining collar means for holding said sample against said platform.

4. Apparatus in accordance with claim 1 further including
   counterbalance means for carrying the weight of the transducer and indenter so that the only weight acting on the indenter and the sample is that due to the applied load.

5. Apparatus for determining the rheological properties of a sample by continuously monitoring the depth of penetration of an indenter into the surface of the sample, the apparatus comprising
   a platform having a convex surface for supporting the test sample, the convex surface having a spherical radius;
   an indenter for penetrating the surface of the sample;
   a linear voltage differential transformer connected to the indenter for generating an electrical signal analogous to the depth of penetration of the indenter; and
   means for applying a load to one end of said indenter wherein the opposite end of the indenter moves relative to said transformer, the load providing the impetus to cause the indenter to penetrate the surface of the sample.

* * * * *